(12) United States Patent
Kawamoto

(10) Patent No.: US 8,057,113 B2
(45) Date of Patent: Nov. 15, 2011

(54) BLADE DRIVE DEVICE AND OPTICAL APPARATUS

(75) Inventor: Hisashi Kawamoto, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/636,972

(22) Filed: Dec. 14, 2009

(65) Prior Publication Data

US 2010/0092166 A1 Apr. 15, 2010

Related U.S. Application Data

(63) Continuation of application No. PCT/JP2009/053180, filed on Feb. 23, 2009.

(30) Foreign Application Priority Data

Apr. 25, 2008 (JP) ................................. 2008-116094

(51) Int. Cl.
G03B 9/10 (2006.01)

(52) U.S. Cl. ........................................ 396/493; 396/498

(58) Field of Classification Search .................... 396/493
See application file for complete search history.

(56) References Cited

U.S. PATENT DOCUMENTS

| | | | |
|---|---|---|---|
| 4,590,818 A | | 5/1986 | Teraoka |
| 4,782,353 A | * | 11/1988 | Ogihara et al. ................ 396/463 |
| 5,327,193 A | * | 7/1994 | Date et al. ...................... 396/242 |
| 5,384,506 A | * | 1/1995 | Aoshima ..................... 310/49.11 |
| 5,926,663 A | * | 7/1999 | Suzuki ........................... 396/449 |
| 6,714,733 B2 | * | 3/2004 | Kobayashi .................... 396/133 |
| 7,677,740 B2 | * | 3/2010 | Takeuchi et al. ................ 353/97 |
| 2002/0141748 A1 | * | 10/2002 | Shirie ............................ 396/132 |
| 2006/0071111 A1 | * | 4/2006 | Tanaka et al. ................. 242/374 |
| 2008/0120809 A1 | * | 5/2008 | Nakasone ........................ 16/338 |

FOREIGN PATENT DOCUMENTS

| | | |
|---|---|---|
| JP | 59-160321 | 10/1984 |
| JP | 6-153444 | 5/1994 |
| JP | 6-186611 | 7/1994 |
| JP | 7-199273 | 8/1995 |
| JP | 8-289529 | 11/1996 |
| JP | 10-61728 | 3/1998 |
| JP | 11-130292 | 5/1999 |
| JP | 2007-72356 A1 | 3/2007 |
| JP | 2007-247882 A1 | 9/2007 |

OTHER PUBLICATIONS

International Search Report for International Application No. PCT/JP2009/053180 dated Mar. 13, 2009.

* cited by examiner

*Primary Examiner* — Rodney Fuller
*Assistant Examiner* — Linda B Smith
(74) *Attorney, Agent, or Firm* — Kratz, Quintos & Hanson, LLP

(57) ABSTRACT

A blade drive device includes a shutter unit. The shutter unit includes: a blade swingably supported; and a plurality of boards defining a blade chamber, each having an opening opened and closed by the blade, and an actuator serving as a drive force of the blade and including a rotor having a rotary shaft. The rotary shaft penetrates to the blade chamber. An elastic member is housed in the blade chamber, and urges the rotary shaft in a thrust direction.

8 Claims, 3 Drawing Sheets

BLADE DRIVE DEVICE AND OPTICAL APPARATUS

CROSS-REFERENCE TO RELATED APPLICATION

This application is a continuation of and claims priority to International Patent Application No. PCT/JP2009/053180 filed on Feb. 23, 2009, which claims priority to Japanese Patent Application No. 2008-116094 filed on Apr. 25, 2008, subject matter of these patent documents is incorporated by reference herein in its entirety.

BACKGROUND OF THE INVENTION

1. Field of the Invention

The present invention relates to blade drive devices and optical apparatuses.

2. Description of the Related Art

In a device disclosed in Japanese Unexamined Patent Publication No. 8-289529, a shaft portion of a magnetic rotor is magnetized at a given polarity. The magnetic force is exerted between the shaft and a stator yoke, thereby applying a thrust-direction force to the rotor. This prevents a play in the thrust direction. Additionally, Patent Document 1 proposes that this device is employed in an aperture device of an optical apparatus In the device disclosed in Japanese Unexamined Patent Publication No. 8-289529, the thrust-direction force has to be generated by the magnetic force. To this end, a sufficient strength of the magnetic force and a sufficient size of the device are required. Therefore, there is a problem of a large restriction in design, thereby making it difficult to slightly adjust the force. Further, the shaft portion has to be magnetized, so that a process for magnetizing the rotor may be complicated and the cost may be increased. Furthermore, the shape of the stator may be complicated.

To overcome the above problems, it is conceivable that the rotor is urged by an elastic member such as a spring so as to apply the thrust-direction force to the rotor. However, if the spring or the like is employed, the device itself may be increased in size in the thrust direction.

Besides, the conventional stepping motors do not stably stop every other pulse in the non-energized state. Stoppable positions of the aperture blades result in every other pulse. This raises a problem that the blades cannot be controlled at high speed with high accuracy.

In a case where the all pluses are respectively associated with the aperture diameters for the purpose of overcoming the above problem, there has been an aperture device. This aperture device maintains to apply a voltage, which is lower than that used in the driving, at positions where the blades cannot stop in the non-energized state. However, power consumption may be problematic.

SUMMARY OF THE INVENTION

It is therefore an object of the present invention to provide a blade drive device and an optical apparatus, whereby the rattling of a rotor in the thrust direction can be suppressed to reduce operational sound of an actuator, a thrust-direction force against the rotor can be adjusted with ease, upsizing in the thrust direction and increasing the manufacturing cost can be suppressed, and the aperture diameter can be controlled at high speed and with high accuracy.

According to an aspect of the present invention, there is provided a blade drive device including: a shutter unit including: a blade swingably supported; and a plurality of boards defining a blade chamber, each having an opening opened and closed by the blade; and an actuator serving as a drive force of the blade and including a rotor having a rotary shaft; wherein: the rotary shaft penetrates to the blade chamber; and an elastic member is housed in the blade chamber, and urges the rotary shaft in a thrust direction.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
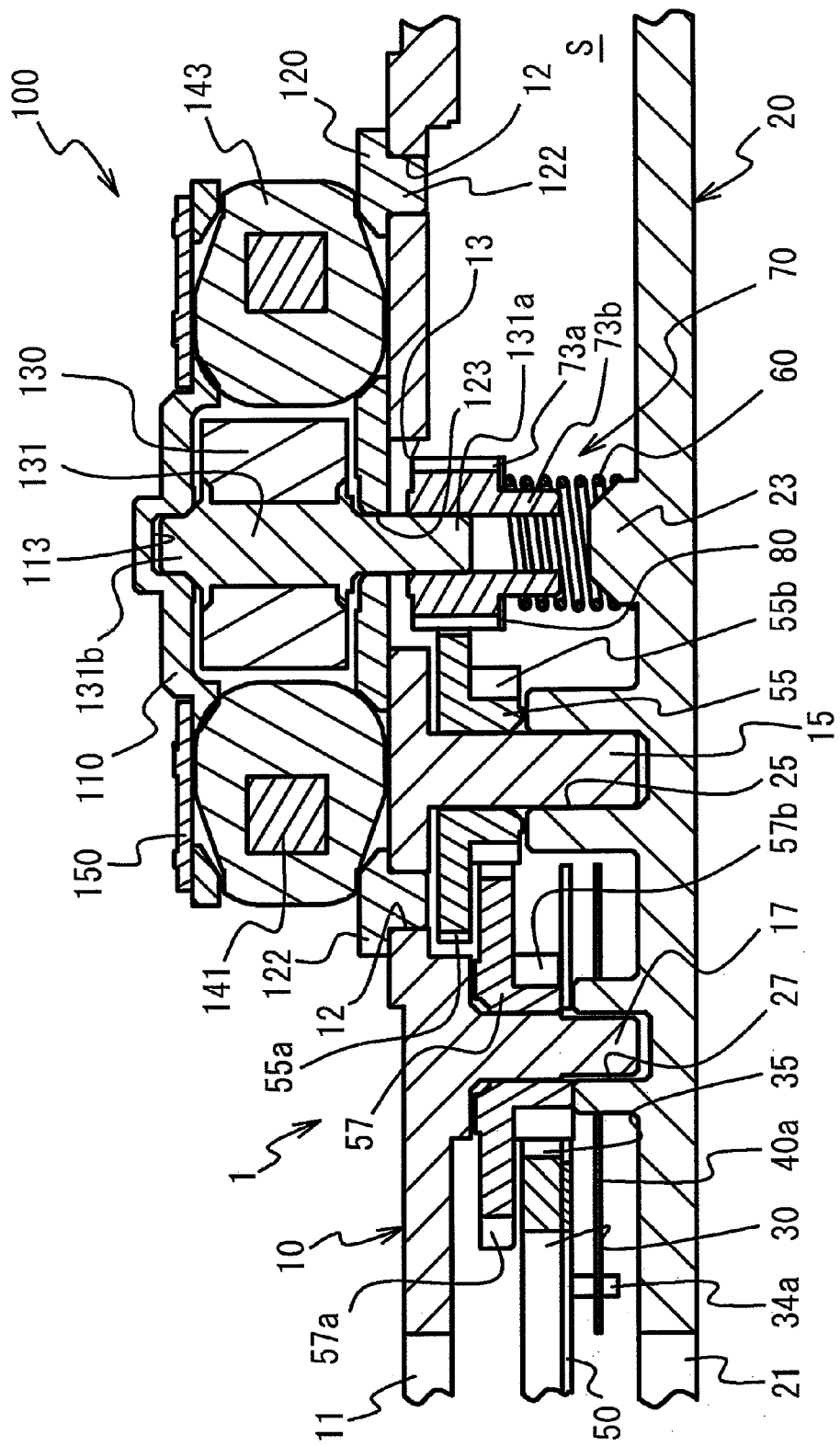
FIG. 1 is a cross-sectional view of a blade drive device.

A description will be given of embodiments according to the present invention with reference to the drawings. FIG. 1 is a cross-sectional view of a blade drive device employed in an optical apparatus. The blade drive device functions as an aperture device for adjusting the mount of light reaching an image pickup element (not illustrated) installed in the optical apparatus. The blade drive device is equipped with a shutter unit 1 and an actuator 100. The shutter unit 1 includes: boards 10 and 20; a drive ring 30 disposed within a blade chamber S defined between the boards 10 and 20; blades 40a to 40c to be mentioned later; and gears 55 and 57. The actuator 100 which serves as a drive source for driving the blades 40a to 40c is fixed on the board 10. The drive force from the actuator 100 is transmitted to the blades 40a and 40c, so that the blades 40a and 40c adjust the opening amounts of the openings 11 and 21. The opening amounts of the openings 11 and 21 are adjusted, thereby also adjusting the object light entering the image pickup element.

The actuator 100 will be described. The actuator 100 is a so-called stepping motor, and is capable of stopping at a given rotational angle. The actuator 100 includes: case plates 110 and 120; a rotor 130 rotationally supported and magnetized to have plural magnetic poles in its circumferential direction; a stator 141 generating the magnetic force between the stator 141 and the rotor 130; a coil 143 wound around the stator 141 and for exciting the stator 141.

The rotor 130 is made of a magnetic resin. Further, the rotor 130 is integrally formed with a rotary shaft 131 by insert molding. Thus, the rotary shaft 131 rotates in conjunction with the rotor 130. The rotor 130, the stator 141, and the coil 143 are disposed between the case plates 110 and 120. The case plate 120 is formed with a shaft hole 123 through which one end 131a of the rotary shaft 131 penetrates. Moreover, the case plate 110 is formed with a shaft hole 113 into which the other end 131b of the rotary shaft 131 is rotatably fitted. The case plate 110 corresponds to a support member.

A printed substrate 150 which is electrically connected to the coil 143 is attached on the outside of the case plate 110. A CPU, not illustrated, installed in the optical apparatus causes the printed substrate 150 to control an energized state of the coil 143. This controls the rotation of the rotor 130.

The case plate 120 is provided with projection portions 122 extending outwardly. The projection portions 122 are respectively engaged with hole portions 12 formed on the board 10. This assembles the actuator 100 into the shutter unit 1. Further, the board 10 is formed with an insertion hole 13 through which the rotary shaft 131 penetrates. Furthermore, one end 131a of the rotary shaft 131 is press fitted into a pinion gear 70 for transmitting the rotational force of the rotor 130 to its outside. One end 131a and the pinion gear 70 are disposed within the blade chamber S. Also, the pinion gear 70 is made of a resin.

In addition, a coil spring 60 is disposed between the pinion gear 70 and the board 20. The coil spring 60 is in contact with the pinion gear 70 and urges the pinion gear 70 in the thrust direction. Since the pinion gear 70 is press fitted on one end 131a of the rotary shaft 131, the pinion gear 70 is urged in the thrust direction, thereby urging the rotor 130 and the rotary shaft 131 in the thrust direction. That is, the rotary shaft 131 is urged toward the case plate 110. The coil spring 60 and the pinion gear 70 will be described later in more detail.

Figure 2:
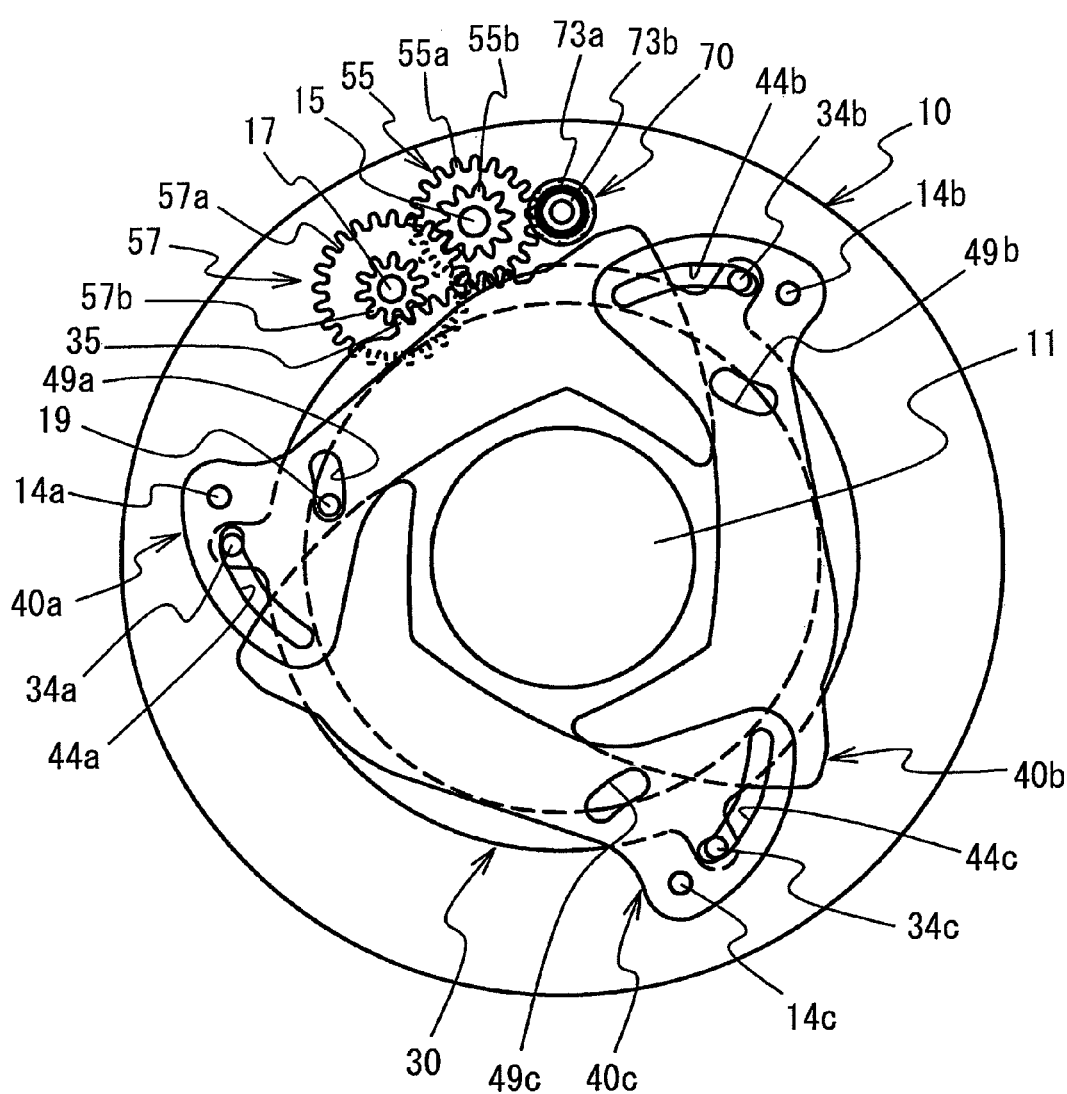
FIG. 2 is a front view of the blade drive device.

Next, a description will be given of the transmitting path of the drive force of the actuator 100. FIG. 2 is a front view of the blade drive device in a fully opened state in which the blades are receded from the opening 11. In addition, the board 20 is omitted in FIG. 2. The pinion gear 70 is provided with a teeth portion 73a at its outer peripheral portion. The teeth portion 73a meshes with a large diameter teeth portion 55a of the gear 55. The gear 55 is rotatably fitted with a pin 15 formed on the board 10. Additionally, the gear 55 has a small diameter teeth portion 55b, and the diameter thereof is smaller than that of the large diameter teeth portion 55a. The small diameter teeth portion 55b meshes with a large diameter teeth portion 57a of the gear 57. The gear 57 is also rotatably fitted with a pin 17 formed on the board 10. Moreover, the gear 57 has a small diameter teeth portion 57b, and the diameter thereof is smaller than that of the large diameter teeth portion 57a. The rotational drive force of the pinion gear 70 is decelerated via the gears 55 and 57. In addition, the pins 15 and 17 are respectively engaged with engagement recess portions 25 and 27. Therefore, the boards 10 and 20 are assembled.

The drive ring 30 rotatably supported is disposed within the blade chamber S. The drive ring 30 is substantially concentric with the openings 11 and 21. The outer peripheral portion of the drive ring 30 is formed with a teeth portion 35 in a given range, as illustrated in FIG. 2. The teeth portion 35 meshes with the small diameter teeth portion 57b of the gear 57. In this manner, the rotational drive force of the rotor 130 is decelerated and transmitted to the drive ring 30, via the pinion gear 70 and the gears 55 and 57.

The drive ring 30 is provided with three drive pins 34a to 34c at equal intervals. Further, the three blades 40a to 40c are disposed within the blade chamber S. Herein, a blade support plate 50 is provided between the drive ring 30 and the blades 40a to 40c, and serves to separate the drive ring 30 from the blades 40a to 40c and to prevent the interference of their operations. Each of the blades 40a to 40c has the same shape. The blades 40a to 40c are respectively provided with cam slots 44a to 44c having an arc shape. The drive pins 34a to 34c are slidably engaged in the cam slots 44a to 44c, respectively. Additionally, the blades 40a to 40c are swingably supported on support shafts 14a to 14c formed on the board 10. The support shafts 14a to 14c are located at the outside of the drive ring 30.

Further, the blades 40a to 40c are provided with slots 49a to 49c. The slots 49a to 49c are close to center portions of the blades 40a to 40c, and the cam slots 44a to 44c are apart from the center portions of the blades 40a to 40c, respectively. Furthermore, as illustrated in FIG. 2, the board 10 is formed with a single regulation pin 19. This regulation pin 19 is engaged in the slot 49a. The regulation pin 19 comes into contact with the inner ends portion of the slot 49a, thereby limiting the range in which the blade 40a swings.

For example, when the drive ring 30 rotates counterclockwise from the state as illustrated in FIG. 2, the drive pins 34a to 34c also move counterclockwise. The drive pins 34a to 34c slide within the cam slots 44a to 44c, and the blades 40a to 40c swing about the support shafts 14a to 14c, respectively, to overlap the opening 11. The blades 40a to 40c are positioned to overlap the opening 11, thereby adjusting the opening amount of the opening 11. Further, since the actuator 100 is the stepping motor, the stop position of the rotor 130 can be adjusted. Therefore, the blades 40a to 40c can be positionally adjusted. Accordingly, the opening amount of the opening 11 can be finely adjusted.

Next, the coil spring 60 and the pinion gear 70 will be described in more detail. The coil spring 60 is fitted into a protrude portion 23 formed on the inner surface side of the board 20. The protrude portion 23 is arranged in such a position to face the pinion gear 70. The diameter of the protrude portion 23 is slightly smaller than that of the coil spring 60. This prevents the displacement of the coil spring 60.

The pinion gear 70 will be described in more detail. As illustrated in FIG. 1, the pinion gear 70 has the teeth portion 73a at its outer peripheral portion, and has a small diameter portion 73b at its axial end side. The diameter of the small diameter portion 73b is smaller than that of the teeth portion 73a. The coil spring 60 is arranged to surround the small diameter portion 73b. The diameter of the small diameter portion 73b is smaller than that of the coil spring 60. The small diameter portion 73b has a cylindrical shape.

In this manner, the coil spring 60 has one end fitting with the protrude portion 23, and has the other end fitting into the small diameter portion 73b with a given clearance. This prevents the displacement of the coil spring 60.

A slidable member 80 having a ring shape is arranged between the pinion gear 70 and the coil spring 60. The slidable member 80 is arranged at a step portion defined by the teeth portion 73a and the small diameter portion 73b, and is fitted with the small diameter portion 73b with a given clearance. The slidable member 80 is made of a good sliding material such as a PET (polyethylene terephthalate) film that is coated with a lubricant. This reduces the frictional resistance generated between the coil spring 60 and the pinion gear 70.

As described above, the coil spring 60 urges the rotor 130 in the thrust direction via the pinion gear 70. Also, the coil spring 60 is arranged within the blade chamber S. Such a configuration causes the thickness of the blade drive device not to change in the direction of the rotary shaft 131, in comparison with a case where the coil spring 60 is not provided. Since the coil spring 60 arranged within the blade chamber S has no effect on the thickness of the blade drive device in the direction of the rotary shaft 131, the blade drive device can be suppressed from upsizing in the thrust direction and can be reduced in thickness. Further, since the rotor 130 is urged in the thrust direction, the rotor 130 is suppressed from rattling. This suppresses the hunting of the actuator 100 and reduces the operational sound thereof.

Moreover, a coil spring with a different spring constant is employed as an elastic member, thereby readily adjusting the urging force against the rotor 130. Also, unlike the conventional techniques, the rattling of the rotor 130 can be prevented without making a rotary shaft of a material such as a magnetic resin and without magnetizing its axial end with a given magnetic pole. This suppresses an increase in the manufacturing cost caused by the complicated magnetizing process.

Further, the thrust-direction force is effected without disturbing the driving of the blades 40a to 40c, and thus the frictional force is generated in the rotational direction of the rotor 130. Therefore, the rotor 130 can be stopped at all pluses in the non-energized state in which the actuator 100 is not energized. Herein, the cam slots 44a to 44c of the blades 40a to 40c are arranged such that the blades 40a to 40c stop with a desired aperture diameter in each pulse, thereby controlling the aperture diameter at high speed and with high accuracy. This is because, in the blade drive device according to the present invention, each of the rotational times of the rotor 130 and the drive ring 30 becomes half during the aperture diameter when changing from the maximum to the minimum, as compared with the conventional blade drive device in which the desired aperture diameter is defined every other pulse, under a condition that the aperture diameter types are identical. In association with this, the cam slots 44a to 44c become shorter, so the blades 40a to 40c become smaller. That is, the period taken from the maximum aperture diameter to the minimum one is shorter, thereby controlling the blade at high speed. In addition, the blades 40a to 40c are made smaller, thereby suppressing the upsizing of the blade drive device. Further, in the blade drive device according to the present invention, the number of the types of aperture diameters to be controlled from the maximum to the minimum is doubled, under a condition that the rotational angle of the rotor 130 is identical to that of the conventional blade drive device in which a desired aperture diameter is defined every other pulse. This allows the aperture diameter to be controlled with high accuracy.

Next, a brief description will be given of the assembling process of the blade drive device. First, the actuator 100 beforehand assembled is assembled into the board 10. At this time, the projection portions 122 are engaged with the hole portions 12 so as to insert the pinion gear 70 into the insertion hole 13. The insertion hole 13 has a size into which the pinion gear 70 is inserted. Next, the gears 55 and 57 are respectively inserted with the pins 15 and 17 in such a manner that the teeth portion 73a of the pinion gear 70 meshes with the large diameter teeth portion 55a of the gear 55, and that the small diameter teeth portion 55b of the gear 55 meshes with the large diameter teeth portion 57a of the gear 57. Also, the drive ring 30 is disposed on the board 10 such that the teeth portion 35 meshes with the small diameter teeth portion 57b. Next, after the blade support plate 50 is attached, the support shafts 14a to 14c are respectively inserted into the holes respectively formed in the blades 40a to 40c, whereas the blades 40a to 40c are assembled such that the drive pins 34a to 34c are respectively inserted into the cam slots 44a to 44c.

Next, the slidable member 80 is disposed at the step portion defined by the teeth portion 73a and the small diameter portion 73b. Then, the coil spring 60 is fitted onto the protrude portion 23 of the board 20, and the board 20 is assembled into the board 10 such that the small diameter portion 73b is inserted into the coil spring 60 and the pins 15 and 17 are respectively engaged with the engagement recess portions 25 and 27. In this manner, the blade drive device is assembled.

Figure 3:
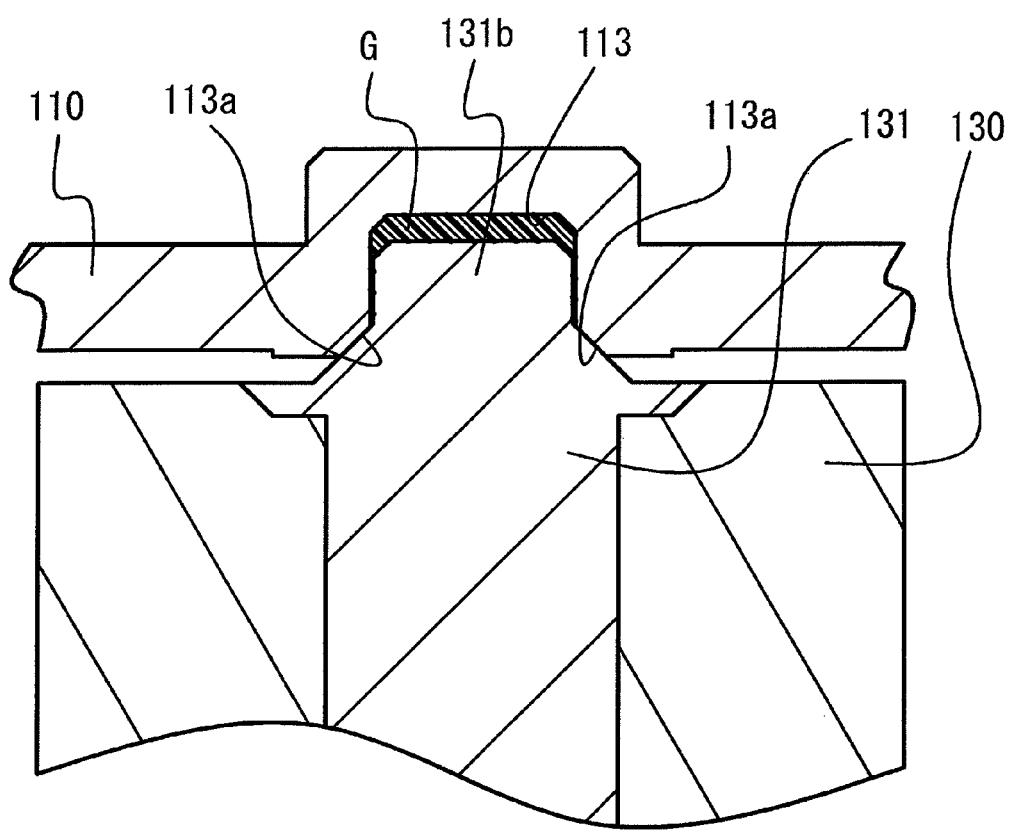
FIG. 3 is an enlarged view of a shaft hole and its vicinity.

Next, a description will be given of the shaft hole 113 formed in the case plate 110. FIG. 3 is an enlarged view of the shaft hole 113 and its vicinity. The shaft hole 113 has a bottom, as illustrated in FIG. 3. A space is defined between the bottom of the shaft hole 113 and an end face of the other end 131b with the rotary shaft 131 urged toward the shaft hole 113. This space is applied with Grease G for reducing the frictional force generated between the shaft hole 113 and the rotary shaft 131. This suppresses an increase in the frictional force caused by much strength of the urging force of the coil spring 60.

Conceivably, the friction generated between the shaft hole 113 and the rotary shaft 131 could be suppressed by employing a coil spring with a weak urging force. However, if the coil spring with a weak urging force is employed, the rotor 130 may not be urged in a stable manner depending on an impact against the actuator 100 or the like. As stated above, the grease G is applied within the shaft hole 113, thereby suppressing the frictional force generated between the shaft hole 113 and the rotary shaft 131 and employing a coil spring with a strong urging force. Therefore, the rotor 130 is urged in a stable manner.

In addition, the grease G is applied within the shaft hole 113 formed on the case plate 110 disposed at a side apart from the shutter unit 1. In this way, the gears G is applied within the shaft hole 113 arranged at the side apart from the shutter unit 1, thereby preventing the grease from leaking to the outside and then intruding into the shutter unit 1. Furthermore, as mentioned above, the rotary shaft 131 is urged toward the shaft hole 113. Accordingly, this prevents the grease G from leaking from the shaft hole 113 into the actuator 100.

Additionally, in the processes for assembling the actuator 100, the grease G has to be applied before the rotary shaft 131 is inserted into the shaft hole 113.

Further, the shaft hole 113 has a taper surface 113a which becomes smaller in diameter from one end 131a of the rotary shaft 131 toward the other end 131b. This suppresses the rattling in the radial direction when the rotary shaft 131 is urged in the thrust direction.

While the exemplary embodiments of the present invention have been illustrated in detail, the present invention is not limited to the above-mentioned embodiments, and other embodiments, variations and modifications may be made without departing from the scope of the present invention.

In the present embodiment, the rotor 130 and the rotary shaft 131 are integrally formed by insert molding. However, a rotor and a rotary shaft may be made of separate parts, or they may be integrated by press fitting or the like.

Finally, several aspects of the present invention are summarized as follows.

According to an aspect of the present invention, there is provided a blade drive device including: a shutter unit including: a blade swingably supported; and a plurality of boards defining a blade chamber, each having an opening opened and closed by the blade; and an actuator serving as a drive force of the blade and including a rotor having a rotary shaft; wherein: the rotary shaft penetrates to the blade chamber; and an elastic member is housed in the blade chamber, and urges the rotary shaft in a thrust direction.

Since the elastic member is housed in the blade chamber and the rotary shaft penetrates to reach the blade chamber, the elastic member can urge the rotary shaft in the thrust direction. This suppresses the rattling of the rotor in the thrust direction and reduces the operational sound of the actuator. Further, the elastic member housed in the blade chamber dose not influence the thickness in the axial direction of the rotary shaft of the blade drive device, thereby suppressing the upsizing thereof and reducing the thickness thereof. Furthermore, the thrust-direction force against the rotor can be easily adjusted by replacing the elastic member. Moreover, the rotary shaft does not have to be magnetized, thereby suppressing the manufacturing cost. Also, with such an above configuration, the actuator can be stopped at all pulses in the non-energized state. The blade is configured such that a desired aperture diameter is associated with any one of the all pluses, thereby controlling the aperture diameter at high speed and with high accuracy.

What is claimed is:

1. A blade drive device, comprising:
a shutter unit including:
a plurality of boards defining a blade chamber therebetween, each board including an opening opened and closed by a blade swingably supported by the boards, and
an actuator serving as a drive force of the blade and including a rotor having a rotary shaft,
wherein:
the rotary shaft penetrates into the blade chamber through a first one of the boards; and
an elastic member is housed in the blade chamber, and urges the rotary shaft in an axial direction thereof.

2. The blade drive device of claim 1, wherein:
one end of the rotary shaft is fitted with a gear transmitting the drive force to the blade;
the actuator includes a support member having a shaft hole for supporting the other end of the rotary shaft for rotation; and
the elastic member urges the gear toward the support member.

3. The blade drive device of claim 2, further comprising a slidable member disposed between the gear and the elastic member that comprises a bearing for rotation of the gear relative to the elastic member.

4. The blade drive device of claim 2, wherein:
the gear includes a teeth portion and a small diameter portion with a diameter smaller than that of a position where the teeth portion is formed; and
the elastic member is a coil spring arranged so as to surround the small diameter portion.

5. The blade drive device of claim 2, wherein:
the shaft hole of the support member has a bottom; and
a space is defined between the bottom of the shaft hole and the other end of the rotary shaft.

6. The blade drive device of claim 4, wherein:
the coil spring is arranged between one of the plurality of boards and the gear; and
the one of the plurality of boards has a protrude portion fitted with the coil spring.

7. The blade drive device of claim 5, wherein the shaft hole has a taper surface becoming smaller in diameter from one end of the rotary shaft toward the other end of the rotary shaft.

8. An optical apparatus, comprising a blade drive device including:
a shutter unit including:
a plurality of boards defining a blade chamber therebetween, each board including an opening opened and closed by a blade swingably supported by the boards, and
an actuator serving as a drive force of the blade and including a rotor having a rotary shaft,
wherein:
the rotary shaft penetrates to the blade chamber through a first one of the boards; and
an elastic member is housed in the blade chamber, and urges the rotary shaft in an axial direction thereof.

* * * * *